United States Patent Office 2,696,294
Patented Dec. 7, 1954

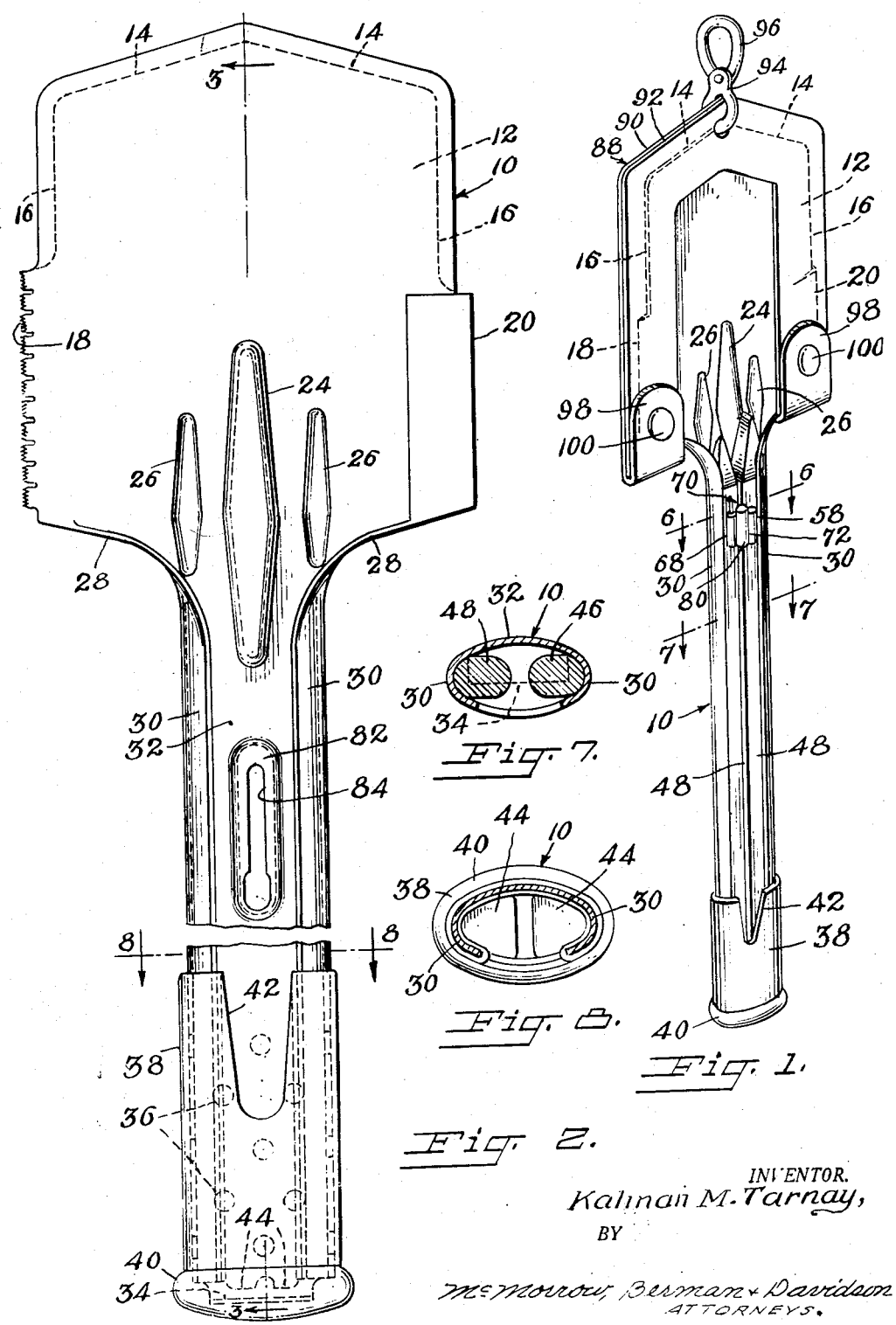

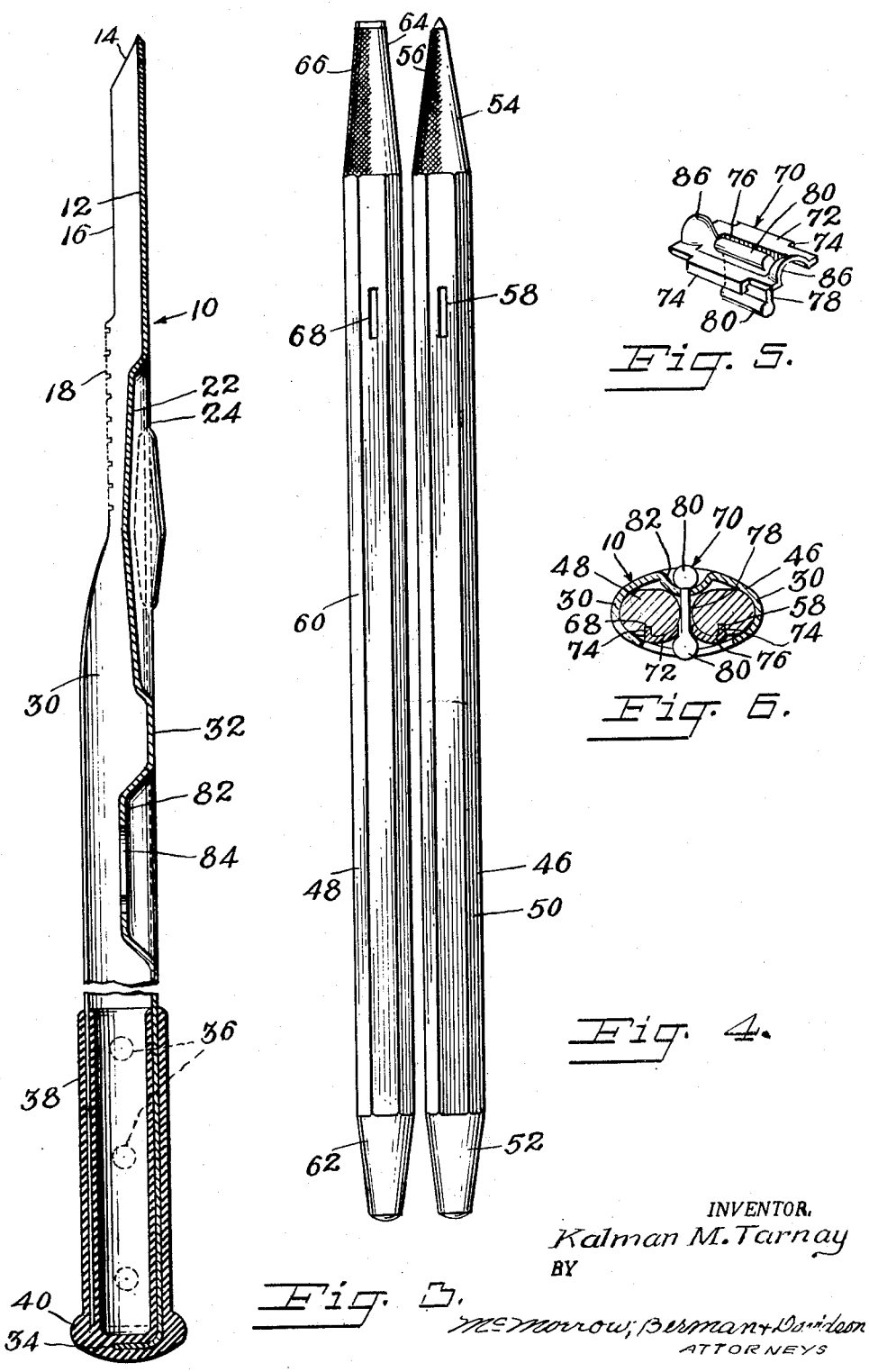

2,696,294

TOOL RECEPTACLE KIT WITH RESILIENT LOCKING MEANS

Kalman M. Tarnay, Cleveland, Ohio

Application September 23, 1952, Serial No. 311,044

1 Claim. (Cl. 206—16)

This invention relates to tools, and more particularly, has reference to a tool of the shovel type.

Most usually, a shovel is a single purpose tool, used for digging operations. In this connection, the need often arises for using some other type of tool, such as a saw, hatchet, chisel, or file, while digging operations are being performed. For example, during war time, the bombing of cities requires that rescue operations be carried out with maximum rapidity, by highly mobile crews of rescue workers carrying with them a minimum amount of heavy equipment.

Thus, it often occurs in these circumstances that persons will be wholly or partially buried under the debris of a structure destroyed by bombing or other enemy activity. Such debris comprises rubble, stones, dirt, lengths of wood, steel bars, etc.

While the rescue operation is being carried out, the worker may be digging for a short period of time, after which the worker may encounter wood, steel bars, or the like, which must be sawed through or filed. It will be readily appreciated that in such instances, much valuable time is lost while the worker is changing from one tool to another.

In view of the above, the broad object of the present invention is to provide a combination tool of the shovel type, in which be embodied, in a single assembly, all the various tools which a rescue worker might need in carrying out operations of the type described above.

Another important object is to provide a tool as stated wherein all the several pieces of equipment will be assembled with one another in a space no greater than that required by a conventional shovel, thus to permit, in effect, a worker to carry a tool which in weight and size is little greater than an ordinary shovel.

Another object is to provide a tool of the type stated so designed as to include a shovel blade all edges of which will be shaped in a manner to make the same highly useful during the carrying out of the worker's duties, one edge of the shovel blade being adapted for digging, another edge being adapted as a saw blade, and a third edge being adapted as an axe or hatchet blade.

Yet another object is to provide a tool as described in which the shovel blade and handle are integrally formed from a single piece of metal material, so designed as to permit the same to be drop forged or readily pressed out of sheet metal material.

Still another important object is to provide a tool as stated wherein the handle portion thereof will be of channeled formation, and will be adapted to receive a plurality of tool shanks, such as those formed in chisels of various types, the channeled handle having a lock means releasably engaging said tool shanks to hold the shanks removably assembled with the handle.

Yet another object is to provide a tool as described wherein a rubber grip will be provided upon the channeled handle, which grip will not only afford a means adapted to be readily grasped by a worker during digging operations, but will afford a tool seat for the tool shanks carried by and within the handle.

A still further object is to provide, for use in association with a tool of the type stated, a carrying means which is adapted to protectively enclose the several edges of the shovel blade, said carrying means being readily connectible to or removable from the shovel blade and being adapted to be suspended from a belt or from some other portion of the worker's garments.

Other objects will appear from the following description, the claim appended thereto, and from the annexed drawings, in which like reference characters designate like parts throughout the several views, and wherein:

Figure 1 is a perspective view of a tool formed in accordance with the present invention, as it appears when assembled with a suitable holder;

Figure 2 is an enlarged elevational view of the tool, a portion of the handle being broken away and the tool shanks being removed;

Figure 3 is a longitudinal section view taken substantially on line 3—3 of Figure 2;

Figure 4 is a view in elevation of the tool shanks per se;

Figure 5 is a persepctive view of the lock means for holding the tool shanks assembled with the handle;

Figure 6 is a transverse sectional view, on an enlarged scale, taken substantially on line 6—6 of Figure 1 and showing said lock means;

Figure 7 is a transverse sectional view on an enlarged scale taken on line 7—7 of Figure 1 and illustrating the arrangement of the tool shanks within the handle; and Figure 8 is an enlarged transverse sectional view taken on line 8—8 of Figure 2, showing the rubber grip provided upon the handle.

The reference numeral 10 has been applied generally in the drawings to designate the combination tool constituting the present invention. The tool includes, at one end thereof, a shovel blade 12, said blade being approximately rectangular in respect to the outer configuration thereof, and having, at one end, convergent end edge portions 14 which meet to form a tapered digging edge on the shovel blade.

The opposite side edges 16 of the shovel blade are extended in parallel relation, and are provided, respectively, with a saw and hatchet edge. The saw edge has been designated by the reference numeral 18, and in providing the saw edge, it is proposed that the serrated edge portion of the shovel blade be separately formed from suitable tool steel suitable for fashioning into a saw blade, the piece of tool steel on which the saw teeth are formed being welded or otherwise fixedly secured to the shovel blade proper, with said shovel blade proper being suitably cut out to accommodate said piece of tool steel.

The hatchet edge 20 can be integrally formed on the saw blade, and is suitably sharpened to permit the same to chop through wood and the like. Or, the hatchet edge portion 20 can, if desired, be formed separately from the material of the shovel blade 12, and welded to said shovel blade.

Formed in the shovel blade 12, at the inner end thereof, is a depression 22, said depression extending longitudinally and centrally of the shovel blade for a suitable distance. In the depression 22 there is formed a plurality of reinforcing ribs, one of said ribs being designated 24 and being relatively elongated, the other ribs being designated 26 and being shorter in length than the rib 24. Ribs 24, 26 can, in some commercial embodiments of the invention, be pressed out of the material of which the shovel blade is formed.

The inner edge portions 28 of the shovel blade 12 converge in a direction away from the shovel blade, and are merged into elongated, parallel side walls 30 of a handle 32.

From the construction so far illustrated and described, it is seen that the shovel blade 12 and the handle 32 having the side walls 30 can be integrally formed from a single piece of material, such as drop forged iron or pressed steel.

It will be noted from Figures 7 and 8 that the side walls 30 are transversely curved, said side walls being bowed oppositely to one another to provide a longitudinal channel in the handle 32, which channel extends for the full length of the handle and opens at one end upon the shovel blade 12.

At that end of the handle remote from the shovel blade 12, the channel of the handle is closed, the web of the handle being extended laterally as shown in Figure 3 to form a lip 34.

The end portion of the handle immediately adjacent the lip 34, is preferably formed of a plurality of openings 36.

Surrounding the handle 32, at that end thereof remote from the shovel blade 12, is a grip 38 of rubber material or the like, said grip being so formed as to have its associated handle end portion fully embedded therein. The openings 36, in this connection, facilitate embedding of the handle end portion in the material of which the grip is formed.

As will be noted from Figures 2 and 3, the grip 38 is of cup-like formation, said grip being formed with a thickened base 40 at one end, in which base the lip 34 of the handle 32 is embedded. The grip is formed, at its other end, with a longitudinal recess 42, aligned with the channel of the handle to facilitate entry or removal of a pair of tool shanks to be described hereinafter.

That surface of the base 40 that closes the channel of the handle is formed with a plurality of depressions 44, said depressions defining tool seats in the handle. These tool seats are adapted to engage one end of chisels 46, 48.

The chisels 46, 48 have been illustrated per se in Figure 4, and considering the construction of the chisel 46, said chisel is formed with an elongated, straight shank 50 of polygonal cross sectional configuration, the shank 50 merging, at one end, into a tapered base end portion 52, which end portion 52 is adapted to engage against one of the seats 44.

At its other end, the shank 50 is integral with a tool formation 54, the formation of the chisel 46 being conical or pyramidal in shape.

Formed in the shank 50, adjacent the formation 54, is a short slot 58, said slot being provided for a purpose to be made presently apparent.

Certain parts of the surfaces of the formation 54 can be roughened as at 56 to provide filing surfaces.

Considering the construction of the chisel 48, said chisel has a shank 60 identical to the shank 50, the shank 60 being merged at one end into a tapered base portion 62 identical to the base portion 52.

At its other end, shank 60 is integral with a tool formation 64, the tool formation 64 being shaped as a flat chisel head. Portions of the opposite surfaces of the chisel head 64 can be roughened to provide filing surfaces 66.

A slot 68 is formed in the shank 60, and is aligned transversely of the shanks with the slot 58.

Carried by the channeled handle is a lock means designated generally at 70. Said lock means includes a plate 72 stamped to shape, the plate 72 having, along its opposite side edges, inwardly turned, relatively elongated locking lugs 74 engageable in the slots 58, 68 respectively when the tool shanks are assembled with the handle.

A longitudinal slot 76, closed at its opposite ends, extends lengthwise of the plate 72, medially between the opposite side edges of said plate, and positioned loosely through said slot is a connecting member 78 of rubber or other resiliently expansible material. The connecting member 78 is formed as a flat, flexible square of material, one edge of said square being integrally formed with a longitudinal enlargement 80 of circular cross section, the other edge of said square material being provided with a similar enlargement.

In the web of the handle 32, in closely spaced relation to the shovel blade 12, is a longitudinal depression 82, having a longitudinal slot 84, the member 78 being loosely positioned through said slot. As will be noted from Figure 6, one of the enlargements 80 is disposed in the depression 82, the other enlargement overlying the plate 72.

In the opposite ends of the plate 72 I form finger-receiving indentations 86, to facilitate elevation of the plate from the handle, whenever the tool shanks are to be disengaged from the plate 72 and removed from the handle.

Ordinarily, the resilient nature of the member 78 causes the enlargements to be drawn toward one another, as a result of which the plate 72 is biased in the direction of the seated tool shanks 50, 60. This causes the locking lug 74 to be engaged removably in the slots 58, 68, thus to hold the tool shanks assembled with the handle 32 of the device.

In this position of the parts, the lock plate 72 straddles the tool shanks in the manner shown in Figure 1, and since the tool shanks are seated at their other ends in the cup-like grip 38, said tool shanks will be held within the handle, and will not interfere with normal use of the tool as a shovel.

When, however, it is desired to use one or both of the chisels, it is merely necessary that the user lift the plate 72 outwardly from the channel of the handle, thus to disengage the plate from the respective tool shanks, and permit removal of said tool shanks.

I provide a holder designated generally at 88 for the tool constituting the present invention, the holder 88 being illustrated in Figure 1 and including a pair of flexible straps 90, 92 of leather material or the like, said straps being of U-shape, so as to enclose between them the digging and tool edges of the shovel blade 12.

The strap 90 is longer than the strap 92 and the free ends of the opposite legs of the strap 90 are folded upwardly over the inner edges 28 of the shovel blade, said free ends being provided with gripper or equivalent fastening elements 100 engaging complementary elements provided upon the strap 92.

In this way, the tool can be protectively enclosed by the holder 88, and the holder itself can be suspended from a belt or from some other portion of the user's garments, by pivotally connected rings 94, 96.

It will be seen that the tool constitutes a compact assembly, providing a single piece of equipment that can be carried conveniently by a rescue worker. The tool, when placed in use, can be swiftly removed from the holder 88, and used for digging purposes.

In rescue operations, it would be customary to use the digging edges 14 in digging through dirt, sand, loose bricks or other rubble.

Should a length of wood, soft metal or iron be met, the saw blade 18 can be used for the purpose of cutting through the obstruction. Or, if it is desired to chop through a length of wood encountered during the rescue operation, the hatchet blade 20 can be used.

Further, if it is necessary to file through a bar of steel or the like, the filing surfaces can be employed, and additionally, the chisels themselves can be used where necessary. The chisels, it may be noted, can also be used as crow bars, with either or both chisels being readily removed from the handle should their use become necessary.

As will be seen, the main body of the tool can be formed from a single piece of material, which material can be either pressed steel or drop forged iron.

It is believed apparent that the invention is not necessarily confined to the specific use and uses thereof described above, since it may be utilized for any purpose to which it may be suited. Nor is the invention to be necessarily limited to the specific construction illustrated and described, since such construction is merely intended to be illustrative of the principles of operation and the means presently devised to carry out said principles, it being considered that the invention comprehends any minor change in construction that may be permitted within the scope of the appended claim.

What is claimed is:

In a combination tool, an elongated handle having a channel extending therealong, said channel having concave side walls and a web connecting corresponding edges of the side walls, a plurality of elongated tool shanks disposed within said channel and extending therealong and engaging said side walls, and locking means mounted on said channel comprising a plate engaging the sides of the tool shanks remote from said web, and an elastic member stretched between a portion of the channel web and said plate and securing said plate in retaining engagement with the tool shanks, said portion of the channel web and said plate having openings therein, and said elastic member comprising a relatively thin intermediate portion positioned between adjacent tool shanks and passing through said openings, and heads on opposite ends of said intermediate portion, said heads being larger in cross section than said openings and being engaged with the sides of the channel web and said plate remote from the tool shanks.

(References on following page)

References Cited in the file of this patent

UNITED STATES PATENTS

| Number | Name | Date |
|---|---|---|
| 671,107 | Douglas | Apr. 2, 1901 |
| 1,124,046 | Lopez et al. | Jan. 5, 1915 |
| 2,083,130 | Sundberg | June 8, 1937 |
| 2,083,131 | Tornebohm | June 8, 1937 |
| 2,176,452 | Choffel | Oct. 17, 1939 |
| 2,558,965 | Koenig | July 3, 1951 |

FOREIGN PATENTS

| Number | Country | Date |
|---|---|---|
| 838,525 | France | Dec. 7, 1938 |